US011272418B2

United States Patent
Takeda et al.

(10) Patent No.: US 11,272,418 B2
(45) Date of Patent: Mar. 8, 2022

(54) WIRELESS COMMUNICATION DEVICE, COMMUNICATION CONTROL METHOD, AND COMPUTER PROGRAM

(71) Applicant: KDDI CORPORATION, Tokyo (JP)

(72) Inventors: Hiroki Takeda, Tokyo (JP); Shingo Watanabe, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/496,779

(22) PCT Filed: Mar. 7, 2018

(86) PCT No.: PCT/JP2018/008763
§ 371 (c)(1),
(2) Date: Sep. 23, 2019

(87) PCT Pub. No.: WO2018/198540
PCT Pub. Date: Nov. 1, 2018

(65) Prior Publication Data
US 2020/0383029 A1 Dec. 3, 2020

(30) Foreign Application Priority Data

Apr. 28, 2017 (JP) .............................. JP2017-090697
May 2, 2017 (JP) .............................. JP2017-091775
May 2, 2017 (JP) .............................. JP2017-091776

(51) Int. Cl.
*H04W 36/32* (2009.01)
*H04W 4/40* (2018.01)
(Continued)

(52) U.S. Cl.
CPC ............. *H04W 36/32* (2013.01); *H04W 4/40* (2018.02); *H04W 36/08* (2013.01); *H04W 48/16* (2013.01)

(58) Field of Classification Search
CPC ....... H04W 4/40; H04W 36/08; H04W 48/16; H04W 36/32; H04W 24/02; H04W 72/04;
(Continued)

(56) References Cited

U.S. PATENT DOCUMENTS 8,412,204 B1  4/2013  Oroskar
9,537,561 B1  1/2017  Kotecha et al.
(Continued)

FOREIGN PATENT DOCUMENTS

CN      1522506 A    8/2004
CN    104777448 A    7/2012
(Continued)

OTHER PUBLICATIONS

Office Action issued in corresponding Japanese Application No. 2019-118768 dated Mar. 3, 2020 with English translation.
(Continued)

*Primary Examiner* — Congvan Tran
(74) *Attorney, Agent, or Firm* — Foley & Lardner LLP

(57) ABSTRACT

A wireless communication device installed in a flying vehicle, includes a wireless communication part configured to receive a wireless signal transmitted from a wireless base station, a cell counter configured to count the number of cells corresponding to wireless base stations identified by wireless signals received by the wireless communication part, and a communication controller configured to change a communication party selecting method to select the wireless base station serving as a communication party from among a plurality of wireless base stations serving as communication party candidates when an increment or a decrement of a unit-time cell count representing the counting result of the cell counter in a predetermined time is equal to or more than a predetermined threshold.

39 Claims, 9 Drawing Sheets

(51) Int. Cl.
*H04W 36/08* (2009.01)
*H04W 48/16* (2009.01)

(58) Field of Classification Search
CPC ........ B64D 45/00; G01C 21/00; G08G 5/003; B64F 1/36
USPC .................................................. 455/436–439
See application file for complete search history.

(56) References Cited

U.S. PATENT DOCUMENTS

| | | | |
|---|---|---|---|
| 10,020,872 B2* | 7/2018 | Murphy | H04B 7/18571 |
| 2016/0073271 A1 | 3/2016 | Schultz | |
| 2016/0297545 A1* | 10/2016 | Yang | H04W 4/029 |
| 2017/0090484 A1* | 3/2017 | Obaidi | B64D 47/08 |
| 2017/0150373 A1* | 5/2017 | Brennan | H04W 16/28 |
| 2017/0295069 A1* | 10/2017 | Sweet, III | C23C 16/45531 |
| 2018/0186448 A1* | 7/2018 | Pantalone | B64C 39/024 |
| 2018/0218619 A1* | 8/2018 | Brown | G08G 5/0034 |
| 2018/0247544 A1* | 8/2018 | Mustafic | H04W 36/32 |
| 2018/0248613 A1* | 8/2018 | Peitzer | H04W 48/10 |
| 2018/0253978 A1* | 9/2018 | Tabuchi | G05D 1/0011 |
| 2018/0288630 A1* | 10/2018 | Guirguis | H04W 24/10 |
| 2020/0100065 A1* | 3/2020 | Liang | G10L 25/51 |
| 2021/0195495 A1* | 6/2021 | Hong | H04W 36/08 |

FOREIGN PATENT DOCUMENTS

| | | |
|---|---|---|
| CN | 105594233 A | 5/2016 |
| JP | 2000-197093 A | 7/2000 |
| JP | 2004-112094 A | 4/2004 |
| JP | 2008-131069 A | 6/2008 |
| JP | 2012-034048 A | 2/2012 |
| JP | 2013-135282 A | 7/2013 |
| JP | 2013-197699 A | 9/2013 |
| JP | 2014-192738 A | 10/2014 |
| JP | 2015-207149 A | 11/2015 |
| JP | 2016-192693 A | 11/2016 |

OTHER PUBLICATIONS

Office Action issued in corresponding Japanese Application No. 2019-129506 dated Mar. 3, 2020 with English translation.
NTT Docomo, Inc., "Requirements, potential problems and solutions on idle and connected mobility for Aerial Vehicles", 3GPP TSG-RAN2#98 R2-1704334, 2017, 2 pages.
Office Action issued in corresponding Chinese Application No. 201880022540.6 dated Apr. 7, 2020 with English translation.
LG Electronics, Potential enhancements to LTE for aerial vehicles, 3GPP TSG RAN WG1 Meeting #88bis R1-1704855, 3GPP, Apr. 7, 2017.
KDDI Corporation, Field measurement results for drone LTE enhancement, 3GPP TSG-RAN WG1 Meeting 88bis R1-1705823, 3GPP, Apr. 7, 2017.
KDDI, Proposal of potential LTE enhancements for Aerial vehicles, 3GPP TSG-RAN2 Meeting #98 R2-1705999, 3GPP, May 19, 2017.
Qualcomm, Leading the world to 5G: Evolving cellular technologies for safer drone operation, Sep. 2016.
International Search Report issued in corresponding International Application No. PCT/JP2018/008763, dated May 29, 2018 with English translation.
Office Action issued in corresponding Japanese Patent Application No. 2017-090697, dated Feb. 19, 2019 with English translation.
Extended European Search Report for corresponding European Application No. 18791620.0, dated Nov. 16, 2020, 9 pages.
NTT Docomo, Initial views on potential problems and solutions for aerial vehicles, 3GPP Draft; R1-1705699, 3GPP TSG RAN WG1 #88bis, Spokane, USA [vol. RAN WG1, No. Spokane, USA]; Apr. 3, 2017-Apr. 7, 2017, Mar. 25, 2017, XP051252118, Retrieved from the Internet: URL:http://www.3gpp.org/ftp/tsg_ran/WG1_RL1/TSGR1_88b/Docs/.
Office Action issued in corresponding Japanese Application No. 2020-174208 dated Dec. 14, 2021 with English translation.

* cited by examiner

FIG. 5

CONFIGURATION EXAMPLES OF HANDOVER PARAMETER CANDIDATE DATA

| | HO PARAMETER SET 1 | HO PARAMETER SET 2 | HO PARAMETER SET 3 |
|---|---|---|---|
| HO PARAMETER SET APPLYING CONDITION | HO CANDIDATE CELL COUNT < 5 | 5 =< HO CANDIDATE CELL COUNT =< 10 | 10 < HO CANDIDATE CELL COUNT |
| HYSTERISIS VALUE | H1 | H2 | H3 |
| TRIGGER TIME (TTT) VALUE | TTT1 | TTT2 | TTT3 |
| FILTER COEFFICIENT | Fillter1 | Fillter2 | Fillter3 |
| INDIVIDUAL CELL OFFSET VALUE | Offset1 | Offset2 | Offset3 |
| MEASUREMENT IDENTIFICATION VALUE | ... | ... | ... |
| MEASUREMENT EVENT VALUE | ... | ... | ... |
| OFFSET PARAMETER FOR EVENT | ... | ... | ... |
| FREQUENCY-SPECIFIC OFFSET VALUE | ... | ... | ... |

FIG. 6

CONFIGURATION EXAMPLES OF
PARAMETER CHANGE REGION INFORMATION

| PARAMETER CHANGE REGION CELL ID |
|---|
| cell_id1、cell_id33、cell_id58、··· |

FIG. 7

CONFIGURATION EXAMPLES OF NEIGHBORING CELL LIST

| NEIGHBORING CELL ID | USED FREQUENCY INFORMATION | CONNECTED CELL ID |
|---|---|---|
| cell_id123 | FREQUENCY INNFORMATION_id123 | cell_id111 |
| cell_id145 | FREQUENCY INFORMATION_id145 | |
| cell_id167 | FREQUENCY INFORMATION_id167 | |
| ⋮ | ⋮ | |

WIRELESS COMMUNICATION DEVICE, COMMUNICATION CONTROL METHOD, AND COMPUTER PROGRAM

TECHNICAL FIELD

The present invention relates to a wireless communication device, a communication control method, and a computer program.

The present application claims the benefit of priority on Japanese Patent Application No. 2017-90697 filed on Apr. 28, 2017, Japanese Patent Application No. 2017-91775 and Japanese Patent Application No. 2017-91776 filed on May 2, 2017, the subject matter of which is hereby incorporated herein by reference.

BACKGROUND ART

Conventionally, handover technology to switch over wireless base stations wirelessly connected to mobile terminals is known (see Patent Document 1).

CITATION LIST

Patent Document

Patent Document 1: Japanese Patent Application Publication No. 2014-192738

SUMMARY OF INVENTION

Technical Problem

Conventional technology is designed to acquire information relating to wireless base stations serving as hand-over destinations for mobile terminals based on the position information of mobile terminals and the reception quality information of mobile terminals.

According to conventional technology, however, it is impossible to acquire information relating to an appropriate wireless base station serving as a handover destination of a mobile terminal existing in the sky, which may cause an unstable condition of communication with a mobile terminal existing in the sky. This is because a good view may be obtained in the sky rather than on the ground. Due to good visibility in the sky rather than on the ground, a larger number of wireless signals from wireless base stations may reach a mobile terminal flying in the sky rather than a mobile terminal located on the ground even when those mobile terminals are each located at the same position in a horizontal direction (i.e. at the same longitude and the same latitude). This may cause a situation allowing for an increasing number of wireless base stations serving as handover destinations having the same level of reception quality in the sky rather than on the ground, which may inadvertently cause an unstable condition of communication with a mobile terminal existing in the sky due to a failure to obtain information relating to an appropriate wireless base station serving as a handover destination of a mobile terminal existing in the sky.

The present invention is made in consideration of the aforementioned circumstances and aims to improve the stability of communication with a wireless communication device existing in the sky.

Solution to Problem (1) In an aspect of the present invention, a wireless communication device installed in a flying vehicle includes a wireless communication part configured to receive a wireless signal transmitted from a wireless base station, a cell counter configured to count the number of cells corresponding to wireless base stations identified by wireless signals received by the wireless communication part, and a communication controller configured to change a communication party selecting method to select the wireless base station serving as a communication party from among a plurality of wireless base stations serving as communication party candidates when an increment or a decrement of a unit-time cell count representing the counting result of the cell counter in a predetermined time is equal to or more than a predetermined threshold.

(2) In an aspect of the present invention, the wireless communication device according to (1) includes the communication controller configured to change the communication party selecting method to a predetermined sky communication party selecting method when the increment of the unit-time cell count is equal to or more than the predetermined threshold.

(3) In an aspect of the present invention, the wireless communication device according to (1) further includes a flying-vehicle moving direction determination part configured to determine whether the moving direction of the flying vehicle is either a vertical direction or a horizontal direction. The communication controller currently using the sky communication party selecting method is configured to change the communication party selecting method from the sky communication party selecting method to a predetermined sky communication party selecting method for horizontal movement when the determination result of the flying-vehicle moving direction determination part indicates that the moving direction of the flying vehicle is the horizontal direction.

(4) In an aspect of the present invention, the wireless communication device according to any one of (1) through (3) includes the communication controller configured to change the communication party selecting method to a predetermined ground communication party selecting method when the decrement of the unit-time cell count in the predetermined time is equal to or more than the predetermined threshold.

(5) In an aspect of the present invention, the wireless communication device according to any one of (1) through (4) further includes a horizontal-direction position information acquisition part configured to acquire the horizontal-direction position information representing the position of the flying vehicle in a horizontal direction. The communication controller increases an interval of measuring the unit-time cell count by a predetermined time upon determining that the movement range of the flying vehicle falls within a certain range based on the horizontal-direction position information.

(6) In an aspect of the present invention, the wireless communication device according to any one of (1) through (5) implements the communication party selecting method to change handover parameters for controlling handover with the plurality of wireless base stations serving as the communication party candidates.

(7) In an aspect of the present invention, the wireless communication device according to (6) includes the communication controller configured to acquire handover parameter candidates from the wireless base station accessible by the flying vehicle in its flight location.

(8) In an aspect of the present invention, the wireless communication device according to any one of (1) through (5) implements the communication party selecting method to inhibit handover in a predetermined time.

(9) In an aspect of the present invention, the wireless communication device according to (8) includes the communication controller configured to acquire information representing a handover inhibit time from the wireless base station accessible by the flying vehicle in its flight location.

(10) In an aspect of the present invention, the wireless communication device according to any one of (1) through (5) implements the communication party selecting method to change the number of wireless base stations conducting concurrent communications within a plurality of wireless base stations serving as communication party candidates.

(11) In an aspect of the present invention, the wireless communication device according to any one of (1) through (10) further includes an authentication request part configured to request authentication of the flying vehicle by acquiring the authentication information of the flying vehicle from an authentication information storage installed in the flying vehicle and transmitting the authentication information to an authentication server configured to authenticate the flying vehicle. The communication controller changes the communication party selecting method when the authentication request of the flying vehicle made by the authentication request part results in a successful authentication while the communication controller does not change the communication party selecting method when the authentication request results in a failed authentication.

(12) In an aspect of the present invention, a communication control method for a wireless communication device installed in a flying vehicle includes a wireless reception step of the wireless communication device to receive a wireless signal transmitted from a wireless base station, a cell counting step of the wireless communication device to count the number of cells corresponding to wireless base stations identified by wireless signals received in the wireless reception step, and a communication control step of the wireless communication device to change a communication party selecting method to select the wireless base station serving as a communication party from among a plurality of wireless base stations serving as communication party candidates when an increment or a decrement of a unit-time cell count representing the counting result of the cell counting step in a predetermined time is equal to or more than a predetermined threshold.

(13) In an aspect of the present invention, a computer program causes a computer of a wireless communication device, which is installed in a flying vehicle and which includes a wireless communication part configured to receive a wireless signal transmitted from a wireless base station, to implement a cell counting function of counting the number of cells corresponding to wireless base stations identified by wireless signals received by the wireless communication part, and a communication control function of changing a communication party selecting method to select the wireless base station serving as a communication party from among a plurality of wireless base stations serving as communication party candidates when an increment or a decrement of a unit-time cell count representing the counting result of the cell counting function in a predetermined time is equal to or more than a predetermined threshold.

(14) In an aspect of the present invention, a wireless communication device installed in a flying vehicle includes a wireless communication part configured to receive a wireless signal transmitted from a wireless base station, a neighboring cell list storage configured to store a neighboring cell list received from the wireless base station wirelessly connected to the wireless communication part, and a communication controller configured to change a communication party selecting method to select the wireless base station serving as a communication party from among a plurality of wireless base stations serving as communication party candidates due to the existence of an unlisted cell not listed on the neighboring cell list among a plurality of cells corresponding to wireless base stations identified by wireless signals received by the wireless communication part.

(15) In an aspect of the present invention, a wireless communication device installed in a flying vehicle includes a wireless communication part configured to receive a wireless signal transmitted from a wireless base station, a wireless measurement part configured to measure a radio quality indicator based on the wireless signal received by the wireless communication part, and a communication controller configured to change a communication party selecting method to select the wireless base station serving as a communication party from among a plurality of wireless base stations serving as communication party candidates when the radio quality indicator measured by the wireless measurement part satisfies a predetermined sky indicator condition.

(16) In an aspect of the present invention, the wireless communication device according to (14) or (15) includes the communication controller configured to change the communication party selecting method to a predetermined sky communication party selecting method.

(17) In an aspect of the present invention, the wireless communication device according to (16) further includes a flying-vehicle moving direction determination part configured to determine the moving direction of the flying vehicle is either a vertical direction or a horizontal direction. The communication controller currently using the sky communication party selecting method is configured to change the communication party selecting method from the sky communication party selecting method to a predetermined sky communication party selecting method for horizontal movement according to the determination result of the flying-vehicle moving direction determination part indicating that the moving direction of the flying vehicle is the horizontal direction.

(18) In an aspect of the present invention, the wireless communication device according to (14) through (17) implements the communication party selecting method to change handover parameters for controlling handover among a plurality of wireless base stations serving as communication party candidates.

(19) In an aspect of the present invention, the wireless communication device according to (18) includes the communication controller configured to acquire handover parameter candidates from the wireless base station accessible by the flying vehicle in its flight location.

(20) In an aspect of the present invention, the wireless communication device according to any one of (14) through (17) implements the communication party selecting method to inhibit handover in a predetermined time.

(21) In an aspect of the present invention, the wireless communication device according to (20) includes the communication controller configured to acquire information representing a handover inhibit time from the wireless base station accessible by the flying vehicle in its flight location.

(22) In an aspect of the present invention, the wireless communication device according to any one of (14) through (17) implements the communication party selecting method to change the number of wireless base stations conducting concurrent communications within a plurality of wireless base stations serving as communication party candidates.

(23) In an aspect of the present invention, the wireless communication device according to any one of (14) through (22) further includes an authentication request part configured to request authentication of the flying vehicle by acquiring the authentication information of the flying vehicle from an authentication information storage installed in the flying vehicle and transmitting the authentication information to an authentication server configured to authenticate the flying vehicle. The communication controller changes the communication party selecting method when the authentication request of the flying vehicle made by the authentication request part results in a successful authentication while the communication controller does not change the communication party selecting method when the authentication request results in a failed authentication.

(24) In an aspect of the present invention, a communication control method for a wireless communication device installed in a flying vehicle includes a wireless reception step of the wireless communication device to receive a wireless signal transmitted from a wireless base station, a neighboring cell list storing step of the wireless communication device to store a neighboring cell list, which is received from the wireless base station wirelessly connected thereto, on a neighboring cell list storage, and a communication control step of the wireless communication device to change a communication party selecting method to select the wireless base station serving as a communication party from among a plurality of wireless base stations serving as communication party candidates due to the existence of an unlisted cell not listed on the neighboring cell list among a plurality of cells corresponding to wireless base stations identified by wireless signals received in the wireless reception step.

(25) In an aspect of the present invention, a computer program causes a computer of a wireless communication device, which is installed in a flying vehicle and which includes a wireless communication part configured to receive a wireless signal transmitted from a wireless base station, to implement a neighboring cell list storing function of storing a neighboring cell list received from the wireless base station wirelessly connected to the wireless communication part, and a communication control function of changing a communication party selecting method to select the wireless base station serving as a communication party from among a plurality of wireless base stations serving as communication party candidates due to the existence of an unlisted cell not listed on the neighboring cell list among a plurality of cells corresponding to wireless base stations identified by wireless signals received by the wireless communication part.

(26) In an aspect of the present invention, a communication control method for a wireless communication device installed in a flying vehicle includes a wireless reception step of the wireless communication device to receive a wireless signal transmitted from a wireless base station, a wireless measurement step of the wireless communication device to measure a radio quality indicator based on the wireless signal received in the wireless reception step, and a communication control step of the wireless communication device to change a communication party selecting method to select the wireless base station serving as a communication party from among a plurality of wireless base stations serving as communication party candidates when the radio quality indicator satisfies a predetermined sky indicator condition.

(27) In an aspect of the present invention, a computer program causes a computer of a wireless communication device, which is installed in a flying vehicle and which includes a wireless communication part configured to receive a wireless signal transmitted from a wireless base station, to implement a wireless measurement function of measuring a radio quality indicator based on the wireless signal received by the wireless communication part, and a communication control function of changing a communication party selecting method to select the wireless base station serving as a communication party from among a plurality of wireless base stations serving as communication party candidates when the radio quality indicator satisfies a predetermined sky indicator condition.

Advantageous Effects of Invention

According to the present invention, it is possible to obtain an effect of improving the stability of communication with a wireless communication device existing in the sky.

BRIEF DESCRIPTION OF DRAWINGS

FIG. 5 is a table showing a configuration example of handover parameter candidate data according to one embodiment.

FIG. 6 is a table showing a configuration example of parameter change region information according to one embodiment.

FIG. 7 is a table showing a configuration example of a neighboring cell list 143 according to one embodiment.

DESCRIPTION OF EMBODIMENTS

Hereinafter, the present invention will be described by way of embodiments with reference to the drawings.

Figure 1:
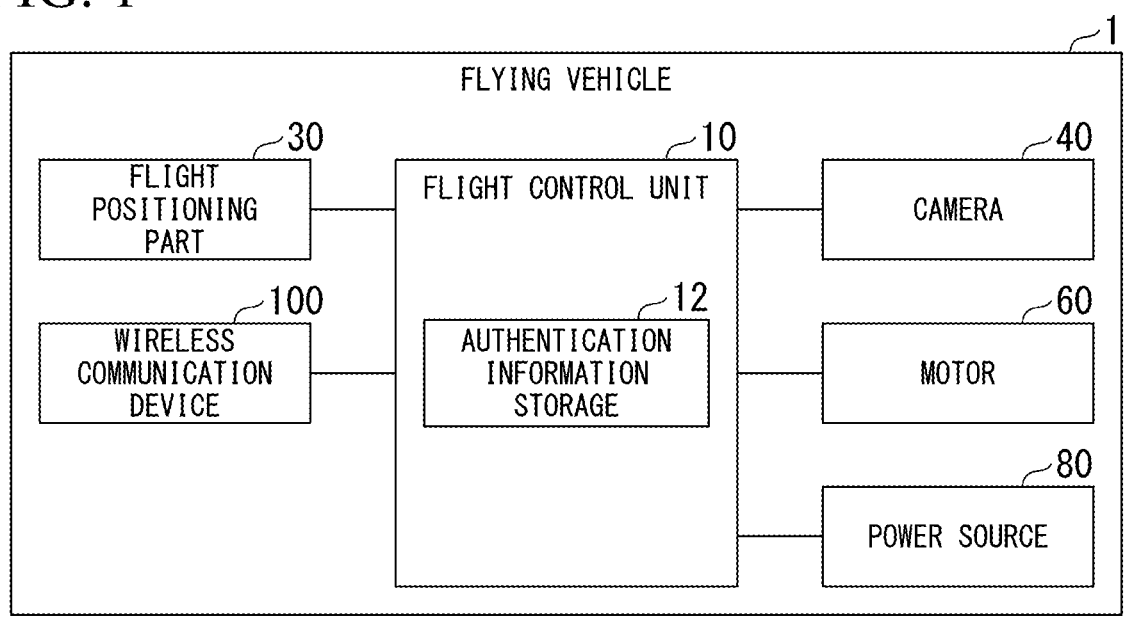
FIG. 1 is a block diagram showing an example of a functional configuration of a flying vehicle according to one embodiment.
Figure 2:
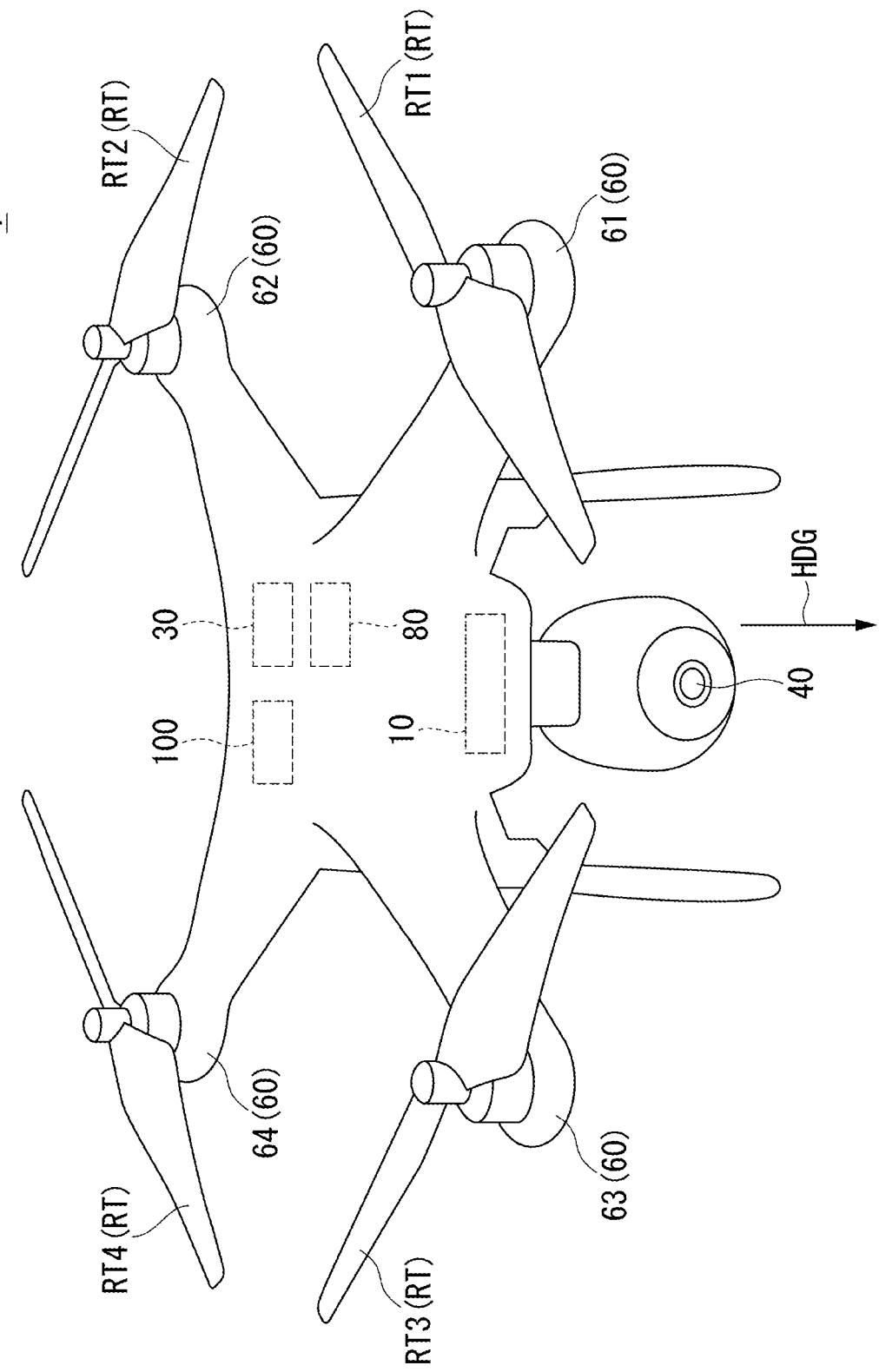
FIG. 2 is a schematic view showing a configuration example of the external appearance of the flying vehicle according to one embodiment.

FIG. 1 is a block diagram showing an example of a functional configuration of a flying vehicle 1 according to the present embodiment. FIG. 2 is a schematic view showing a configuration example of the external appearance of the flying vehicle 1 according to the present embodiment. First, the mechanical configuration of the flying vehicle 1 will be described with reference to FIG. 2.

In FIG. 2, the flying vehicle 1 include motors 60 and rotors RT. The motors 60 rotate the rotors RT to produce lift and propulsion with the flying vehicle 1. In this example, the flying vehicle 1 includes motors 61 through 64. The motors 61 through 64 rotate their rotors RT1 through RT4. By controlling a drive current supplied to each motor 60, it is possible to control the flying vehicle 1 in terms of the flying altitude, the bearing, and the traveling direction.

The flying vehicle 1 is equipped with a camera 40. The camera 40, i.e. an imaging part, is configured to capture a landscape surrounding the flying vehicle 1. I this example, an imaging direction of the camera 40 matches a nose bearing HDG of the flying vehicle 1. In this case, the camera 40 captures a landscape in a forward direction of the flying vehicle 1. The camera 40 outputs an image capturing a landscape.

Next, the functional configuration of the flying vehicle 1 will be described with reference to FIG. 1. In FIG. 1, the flying vehicle 1 includes flight control unit 10, a flight positioning part 30, the camera 40, the motors 60, a power source unit 80, and a wireless communication device 100. The flight control unit 10 includes an authentication information storage 12.

The flight positioning part 30 measures a position of the flying vehicle 1 to produce a measurement result representing a positioning value. The positioning value represents the position in a horizontal direction (i.e. a longitude and a latitude) and a position in a vertical direction (i.e. an altitude). The flight positioning part 30 is equipped with an altimeter as a means of measuring a position in a vertical direction. For example, the flight positioning part 30 may be equipped with a GPS (Global Positioning System) as a means of measuring a position in a horizontal direction.

The wireless communication device 100 is configured to communicate with a wireless base station located externally of the flying vehicle 1. The wireless communication device 100 may communicate with an external device (e.g. a remote control device of the flying vehicle 1 or the like) outside the flying vehicle 1 by way of the wireless base station. For example, the wireless communication device 100 may communicate with a wireless base station connectible to a mobile phone network according to the LTE (Long Term Evolution) system or a wireless base station (e.g. an access point (AP)) connectible to a wireless LAN (Local Area Network) according to the communication system of IEEE 802.11.

The flight control unit 10 controls a drive current supplied to the motors 60 so as to control the flight of the flying vehicle 1. It is possible to set the flight route of the flying vehicle 1 to the flight control unit 10 before flight, or it is possible to set or change the flight route by the flight control unit 10 during flight by way of communication with the wireless communication device 100. The flight control unit 10 controls the motors 60 by comparing the flight route with a positioning value output from the flight positioning part 30 such that the flying vehicle 1 can fly according to the flight route.

The flight control unit 10 may communicate with the wireless communication device 100 to receive a flight control via an external device outside the flying vehicle 1, or the flight control unit 10 may transmit the flight monitoring data representing a flying condition to an external device outside the flying vehicle 1. As the flight monitoring data, for example, an image captured by the camera 40 can be mentioned.

The flight control unit 10 includes the authentication information storage 12. The authentication information storage 12 is configured to store the authentication information of the flying vehicle 1. The authentication information of the flying vehicle 1 is unique to the flying vehicle 1. The authentication information of the flying vehicle 1 is provided to an authentication server (not shown) configured to authenticate the flying vehicle 1, and therefore the authentication server may authenticate the flying vehicle 1.

The function of the flight control unit 10 can be achieved by specific hardware, or the flight control unit 10 can be configured of a CPU (Central Processing Unit) and memory such that the CPU will execute computer programs realizing the function of the flight control unit 10, thus achieving the function.

The power source unit 80 includes a battery serving as a power source of the flying vehicle 1 and a power source monitor configured to monitor the remaining charge level of the battery. The power source unit 80 notifies the flight control unit 10 of the remaining charge level of a battery.

The flight control unit 10 carries out a predetermined flight control process based on the remaining charge level of a battery notified by the power source unit 80. When the remaining charge level of a battery becomes lower than a predetermined threshold, for example, the flight control unit 10 controls the flight of the flying vehicle 1 to return to its original position to start the flight.

Figure 3:
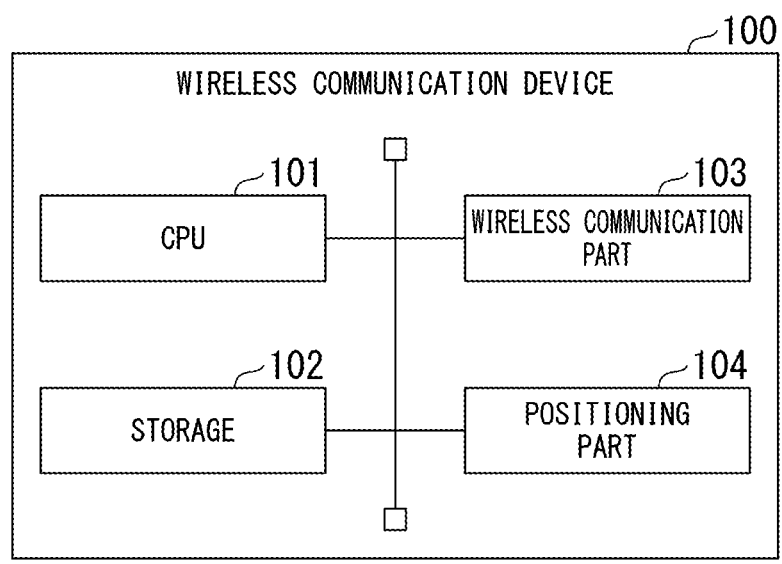
FIG. 3 is a block diagram showing an example of a hardware configuration of a wireless communication device according to one embodiment.

FIG. 3 is a block diagram showing an example of a hardware configuration of the wireless communication device 100 of the present embodiment. In FIG. 3, the wireless communication device 100 includes a CPU 101, a storage 102, a wireless communication part 103, and a positioning part 104. Those parts are configured to exchange data.

The CPU 101 is configured to control the wireless communication device 100. It is possible for the CPU 101 to achieve the control function by executing computer programs. The storage 102 is configured to store various data and computer programs to be executed by the CPU 101.

The wireless communication part 103 is configured to receive wireless signals transmitted by wireless base stations. The wireless communication part 103 is configured to transmit wireless signals to be received by wireless base stations. The wireless communication part 103 may wirelessly communicate with wireless base stations. The wireless communication device 100 may communicate with wireless base stations wirelessly connected to the wireless communication part 103.

The positioning part 104 measures the position of the wireless communication device 100 so as to produce a measurement result representing a positioning value. The positioning value represents a position in a horizontal direction (i.e. a longitude and a latitude). As the positioning part 104, for example, it is possible to use a GPS.

The CPU 101 may achieve the function of the wireless communication device 100 by executing computer programs. As the wireless communication device 100, it is possible to use a general-purpose computer device or a specific hardware device. For example, the wireless communication device 100 may be a mobile communication terminal device like a smartphone.

Figure 4:
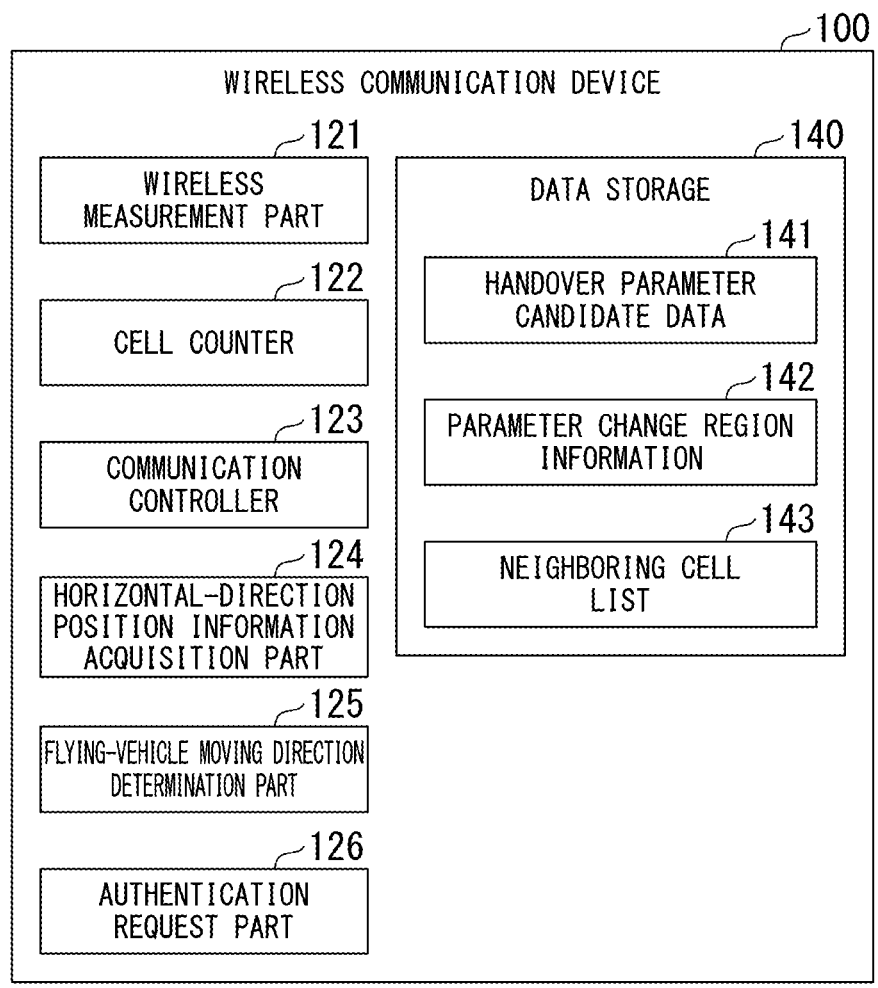
FIG. 4 is a block diagram showing an example of a functional configuration of the wireless communication device according to one embodiment.

FIG. 4 is a block diagram showing an example of a functional configuration of the wireless communication device 100 of the present embodiment. In FIG. 4, the wireless communication device 100 includes a wireless measurement part 121, a cell counter 122, a communication controller 123, a horizontal-direction position information acquisition part 124m, a flying-vehicle moving direction determination part 125, an authentication request part 126, and a data storage 140. The data storage 140 is configured to store handover parameter candidate data 141, parameter change region information 142, and a neighboring cell list 143. The data storage 140 is installed in the storage 102 of the wireless communication device 100.

The wireless measurement part 121 measures a radio quality indicator value based on a wireless signal received by the wireless communication part 103. The radio quality indicator value is a value indicating the quality of wireless communication with the wireless communication device 100. For example, the radio quality indicator value may be a RSSI (Received Signal Strength Indicator), a SINR (Signal to Interference Noise power Ratio), or a RSRP (Reference Signal Received Power).

The cell counter 122 is configured to count the number of cells of wireless base stations to be identified by wireless signals received by the wireless communication part 103. Hereinafter, examples of cell identifying methods according to which the cell counter 122 identifies cells of wireless base stations will be described below.

Example 1 of Cell Identifying Method

According to Example 1 of the cell identifying method, it is possible to identify cells of wireless base stations using the frequencies of wireless signals received by the wireless communication part 103. When the wireless communication part 103 receives a first wireless signal and a second wireless signals having different frequencies, the cell counter 122 detects a first cell corresponding to the first wireless signal and a second cell corresponding to the second wireless signal.

Example 2 of Cell Identifying Method

According to Example 2 of the cell identifying method, it is possible to identify cells of wireless base stations using cell identifications (cell IDs) indicated by wireless signals received by the wireless communication part 103. When the wireless communication part 103 receives a first wireless signal having a first cell ID and a second wireless signal having a second cell ID differently, the cell counter 122 detects two cells, i.e. a first cell having the first cell ID and a second cell having the second cell ID.

Example 3 of Cell Identifying Method

According to Example 3 of the cell identifying method, it is possible to identify cells of wireless base stations using frequencies of wireless signals received by the wireless communication part 103 and cell IDs indicated by wireless signals. When the first cell ID of a first wireless signal differs from the second cell ID of a second wireless signal, the cell counter 122 detects two cells, i.e. a first cell having the first cell ID and a second cell having the second cell ID, with respect to frequencies of wireless signals received by the wireless communication part 103.

In this connection, it is possible to limit the number of cells counted by the cell counter 122 using reception strengths of wireless signals. For example, the cell counter 122 may count only the cells to be identified by wireless signals having reception strengths which fall within a predetermined range (or a cell counting condition range) among wireless signals received by the wireless communication part 103. For example, reception strengths of wireless signals would be a RSSI or a RSRP. For example, the cell counting condition range would be a range of conditions of handover-destination candidates.

The communication controller 123 controls communication using the wireless communication part 103. As one communication control using the wireless communication part 103, the communication controller 123 may change the communication party selecting method for selecting wireless base stations serving as communication parties among a plurality of wireless base stations serving as communication party candidates. An example of the communication party selecting method of the present embodiment is to change handover parameters for controlling handover among a plurality of wireless base stations serving as communication party candidates. Another example of the communication party selecting method of the present embodiment is to change the number of wireless base stations conducting concurrent communications among a plurality of wireless base stations serving as communication party candidates.

The communication controller 123 changes the communication party selecting method to a predetermined sky communication party selecting method upon satisfying an ascending determination condition for determining that the flying vehicle 1 ascends up into the sky from the ground. The sky communication party selecting method is a communication party selecting method applicable to the flying vehicle 1 (or the wireless communication device 100) existing in the sky. The communication controller 123 changes the communication party selecting method to a predetermined ground communication party selecting method upon satisfying a descending determination condition for determining that the flying vehicle 1 descends down to the ground from the sky. The ground communication party selecting method is a communication party selecting method applicable to the flying vehicle 1 (or the wireless communication device 100) located on the ground. The details of a communication control method implemented by the communication controller 123 to change its communication party selecting method will be described later.

The horizontal-direction position information acquisition part 124 acquires the horizontal-direction position information representing the position of the flying vehicle 1 in a horizontal direction. As an example of the present embodiment, the horizontal-direction position information acquisition part 124 acquires a positioning value produced by the positioning part 104 of the wireless communication device 100 installed in the flying vehicle 1. The positioning part 104 of the wireless communication device 100 installed in the flying vehicle 1 produces a positioning value, i.e. the horizontal-direction position information representing the position of the flying vehicle 1 in a horizontal direction.

In this connection, the horizontal-direction position information acquisition part 124 may use the flight positioning part 30 of the flying vehicle 1. In this case, the wireless communication device 100 acquires a horizontal-direction position (i.e. a longitude and a latitude) indicated by the flight positioning part 30 by means of the flight control unit 10. When the horizontal-direction position information acquisition part 124 uses the flight positioning part 30 of the flying vehicle 1, the wireless communication device 100 may include the positioning part 104, or the wireless communication device 100 need not to include the positioning part 104.

The flying-vehicle moving direction determination part 125 determines whether the moving direction of the flying vehicle 1 is either a vertical direction or a horizontal direction. For example, the flying-vehicle moving direction determination part 125 acquires a positioning value produced by the flight positioning part 30 of the flying vehicle 1 (i.e. "a horizontal-direction position (i.e. a longitude and a latitude)" and "a vertical-direction position (i.e. an altitude)" by means of the flight control unit 10, thus determining whether the moving direction of the flying vehicle 1 is either a vertical direction or a horizontal direction based on the positioning value. In this connection, the wireless communication device 100 may be equipped with an acceleration sensor and a gyro-sensor, and therefore the flying-vehicle moving direction determination part 125 may determine whether the moving direction of the flying vehicle 1 is either a vertical direction or a horizontal direction based on the detection results of those sensors.

The authentication request part 126 acquires the authentication information of the flying vehicle 1 from the authentication information storage 12 of the flight control unit 10 installed in the flying vehicle 1, and then the authentication request part 126 sends an authentication request of the flying vehicle 1 by transmitting the authentication information to an authentication server configured to authenticate the flying vehicle 1. The authentication request part 126 receives from the authentication server its response (i.e. authentication passed or failed) to the authentication request of the flying vehicle 1.

The data storage 140 is configured to store the handover parameter candidate data 141, the parameter change region information 142, and the neighboring cell list 143.

The handover parameter candidate data 141 will be described with reference to FIG. 5. FIG. 5 is a table describing a configuration example of the handover parameter candidate data 141. In FIG. 5, the handover parameter candidate data 141 includes a plurality of handover (HO) parameter sets (i.e. three sets in FIG. 5). The HO parameter sets are combinations of handover parameters used to control handover among a plurality of wireless base stations serving as communication party candidates. In this connection, FIG. 5 exemplifies combinations of handover parameters included in HO parameter sets; hence, it is possible to arbitrarily set combinations of handover parameters included in HO parameter sets according to wireless communication systems.

The HO parameter sets include HO parameter set applied conditions. Herein, HO parameter set applied conditions are conditions to apply HO parameter sets. For example, HO parameter set 1 includes a HO parameter set applied condition of "HO candidate cell count <5" indicating that the wireless communication device 100 applies HO parameter set 1 when the HO candidate cell count is less than five.

The parameter change region information 142 will be described with reference to FIG. 6. FIG. 6 is a table describing a configuration example of the parameter change region information 142 according to the present embodiment. In FIG. 6, the parameter change region information 142 includes cell IDs (i.e. parameter change region cell IDs) representing cells of regions to be changed in handover parameters.

The neighboring cell list 143 will be described with reference to FIG. 7. FIG. 7 is a table describing a configuration example of the neighboring cell list 143 according to the present embodiment. A wireless base station wirelessly connected to the wireless communication part 103 provides the neighboring cell list 143 to the wireless communication device 100. The wireless communication device 100 receives from a wireless base station wirelessly connected to the wireless communication part 103 the neighboring cell list 143, which is stored on the data storage 140. In FIG. 7, the neighboring cell list 143 describes cell IDs (or connecting cell IDs) of wireless base stations serving as sources of providing the neighboring cell list 143. The neighboring cell list 143 describes cell IDs (or neighboring cell IDs) of cells neighboring cells having connecting cell IDs as well as the used frequency information representing radio frequencies used by cells having neighboring cell IDs in connection with neighboring cell IDs.

It is possible for wireless base stations to provide the wireless communication device 100 with a plurality of neighboring cell lists 143 according to altitudes. For example, a wireless base station may provide the wireless communication device 100 with the neighboring cell list 143 for the ground and the neighboring cell list 143 for the sky. This is because neighboring cells neighboring a cell of the same wireless base station may be changed with respect to the ground and the sky. The wireless base station provides the wireless communication device 100 located on the ground with the neighboring cell list 143 for the ground, which describes connecting cell IDs of cells neighboring the cell of the wireless base station. The wireless base station provides the wireless communication device 100 existing in the sky the neighboring cell list 143 for the sky, which describes connecting cell IDs of cells neighboring the cell of the wireless base station. The wireless communication device 100 uses the neighboring cell list 143 for the ground upon determining its location on the ground or the neighboring cell list 143 for the sky upon determining its location in the sky.

Accordingly, it is possible to improve the accuracy of selecting communication parties with the wireless communication device 100.

To transmit the neighboring cell list 143 for the sky to the flying vehicle 1, the wireless base station may determine whether or not the wireless communication device 100 is installed in the flying vehicle 1 according to the identification information of the wireless communication device 100. For example, the wireless base station may solely transmit the neighboring cell list 143 for the ground to the wireless communication device 100 not installed in the flying vehicle 1, or the wireless base station may transmit both the neighboring cell lists 143 for the ground and for the sky to the wireless communication device 100 installed in the flying vehicle 1. For example, the identification information of the wireless communication device 100 is unique information of a SIM (Subscriber Identity Module) card mounted on the wireless communication device 100.

Without discriminating the status of the wireless communication device 100, the wireless base station may transmit both the neighboring cell lists 143 for the ground and for the sky when the wireless communication device 100 is connected to a certain cell having a predetermined cell ID. For example, the predetermined cell ID is a cell ID representing a cell having coverage encompassing the flight route of a specific flying vehicle 1.

Next, Examples 1, 2, 3 of communication control methods according to the present embodiment will be described with reference to FIGS. 8, 9, 10.

Example 1 of Communication Control Method

Next, Example 1 of the communication control method according to the present embodiment will be described with reference to FIG. 8. FIG. 8 is a flowchart showing Example 1 of the communication control method according to the present embodiment. According to Example 1 of the communication control method, the communication controller 123 changes the communication party selecting method to select a wireless base station serving as a communication party from among a plurality of wireless base stations serving as communication party candidates when an increment or a decrement in a unit-time cell count, corresponding to the counting result of the cell counter 122 in a predetermined time, is equal to or above a predetermined threshold.

Figure 8:
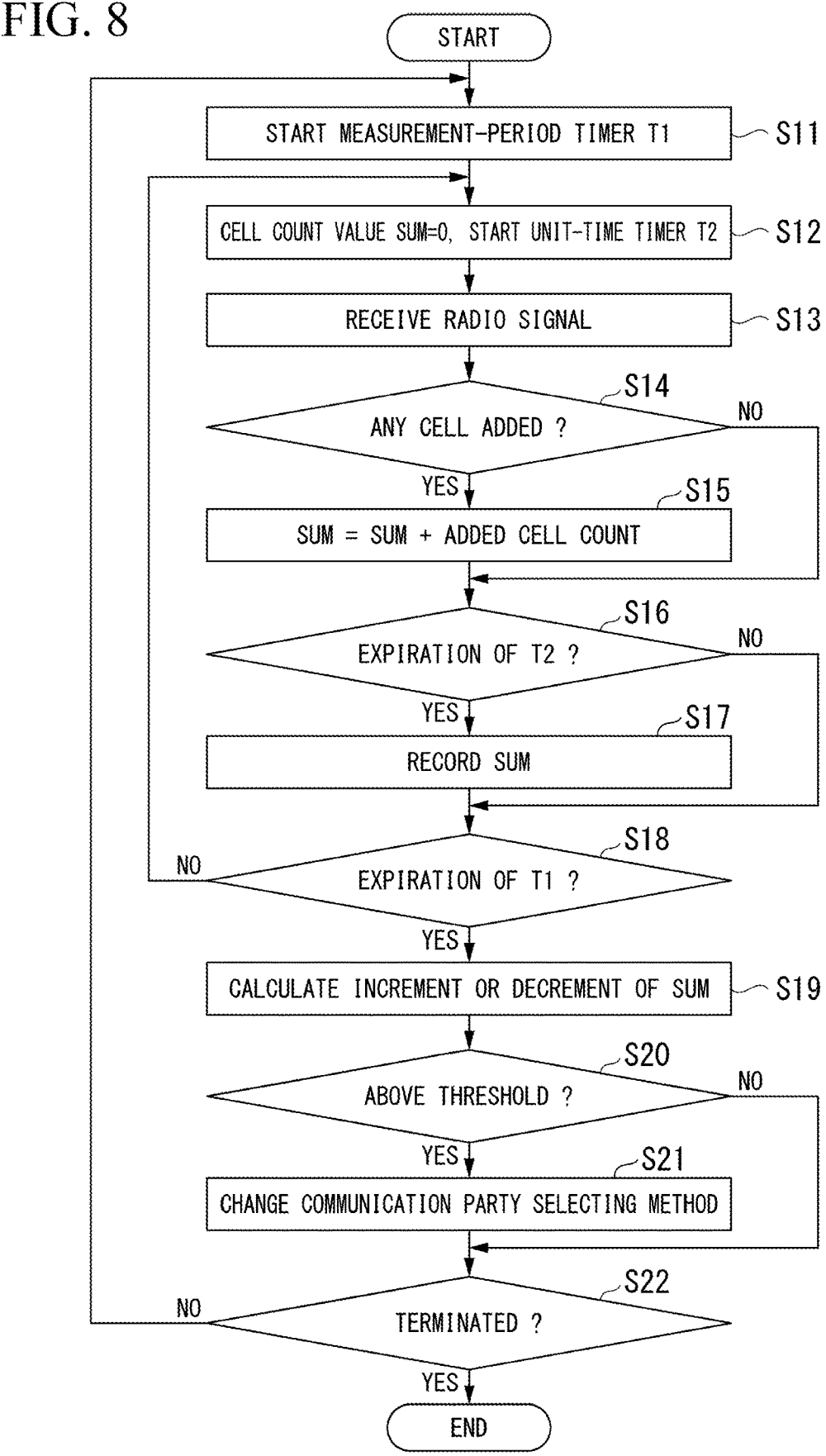
FIG. 8 is a flowchart showing Example 1 of a communication control method according to one embodiment.

The communication control process of FIG. 8 is started in synchronism with a start timing of the flying vehicle 1 to start flying by itself. When the flight control unit 10 inputs a flight start signal, indicating the flying vehicle 1 to start flying, to the wireless communication device 100, for example, the wireless communication device 100 start the communication control process of FIG. 8. Alternatively, it is possible to start the communication control process of FIG. 8 when an external device outside the flying vehicle 1 instructs the wireless communication device 10 to start the communication control process of FIG. 8 by communication.

(Step S11) The communication controller 123 starts a measurement-period timer T1. The measurement-period timer T1 is a timer to check the predetermined time (or a measurement time) for measuring an increment or a decrement of a unit-time cell count corresponding to the counting result of the cell counter 122. A timer period is set to the measurement-period timer T1 in advance. It is possible for an operator to arbitrarily set the timer period of the measurement-period timer T1. For example, an operator may determine the timer period of the measurement-period timer T1 according to the ascending speed and the descending speed which are scheduled to the flying vehicle 1. As an example of a method to determine the timer period of the measurement-period timer T1, it is possible to reduce the timer period of the measurement-period timer T1 as the ascending speed and the descending speed scheduled to the flying vehicle 1 become higher.

(Step S12) The communication controller 123 starts a unit-time timer T2 by resetting the cell counter 122. Due to resetting the cell counter 122, it is possible to reset a cell count value SUM of the cell counter 122 to zero. The unit-time timer T2 is a timer to check the unit time for measuring the unit-time cell count corresponding to the counting result of the cell counter 122. A timer period is set to the unit-time timer T2 in advance. It is possible for an operator to arbitrarily set the timer period of the unit-time timer T2. In this connection, the timer period of the unit-time timer T2 is shorter than the timer period of the measurement-period timer T1.

(Step S13) The wireless communication part 103 receives a wireless signal transmitted thereto from a wireless base station.

(Step S14) The cell counter 122 determines whether or not a cell (or an added cell) is added to the cells of the wireless base stations identified by wireless signals received by the wireless communication part 103. This cell identifying method is set in advance. For example, an operator may set any one of Examples 1, 2, 3 of cell identifying methods to the wireless communication device 100 according to the communication system of a wireless base station existing around the flying place of the flying vehicle 1. If an added cell is found, the flow proceeds to step S15. If not, the flow proceeds to step S16.

(Step S15) The cell counter 122 adds the number of added cells (or an added cell count) to the cell count value SUM.

(Step S16) The communication controller 123 determines expiration of the unit-time timer T2. Due to the expiration of the unit-time timer T2, the flow proceeds to step S17. Otherwise, the flow proceeds to step S18.

(Step S17) The communication controller 123 records the cell count value SUM as a unit-time cell count at the measurement time in connection with the current time (i.e. the measurement time).

(Step S18) The communication controller 123 determines expiration of the measurement-period timer T1. Due to the expiration of the measurement-period timer T1, the flow proceeds to step S19. Unless the expiration of the measurement-period timer T1, the flow returns to step S12 to measure the next unit-time cell count.

(Step S19) Based on the recording of the unit-time cell count, the communication controller 123 calculates an increment or a decrement of the unit-time cell count in the current measurement period (or the timer period of the measurement-period timer T1). As a result, the communication controller 123 calculates an increment of the unit-time cell count due to an increase of the unit-time cell count in the current measurement period while the communication controller 123 calculates a decrement of the unit-time cell count due to a decrease of the unit-time cell count in the current measurement period.

(Step S20) The communication controller 123 determines whether or not an increment or a decrement of the unit-time cell count according to the calculation result is equal to or above a predetermined threshold. The predetermined threshold is set in advance. It is possible for an operator to arbitrarily set the threshold. For example, an operator may determine the threshold according to the ascending speed and the descending speed scheduled to the flying vehicle 1. As an example of the threshold determination method, it is possible to reduce the threshold as the ascending speed and the descending speed scheduled to the flying vehicle 1 becomes higher. The flow proceeds to step S21 when the determination result of step S20 indicates that an increment or a decrement of the unit-time cell count is equal to or above the threshold. Otherwise, the flow proceeds to step S22.

(Step S21) The communication controller 123 changes the communication party selecting method. The following descriptions show examples of methods how to change the communication party selecting method.

Example 1 of Method to Change Communication Party Selecting Method

The communication controller 123 changes the communication party selecting method to a predetermined sky communication party selecting method when an increment of the unit-time cell count is equal to or above a predetermined ascending determination threshold (or an increment of the unit-time cell count satisfies an ascending determination condition). As an example of the method how to determine the ascending determination threshold, it is possible to determine a larger value than an increment of the unit-time cell count at the flying place of the flying vehicle 1 on the ground. When an increment of the unit-time cell count satisfies the ascending determination condition, it is possible to determine that the flying vehicle 1 will ascend up to the sky from the ground. Accordingly, the communication controller 123 changes the communication party selecting method to the sky communication party selecting method suitable to the flying vehicle 1 (or the wireless communication device 100) existing in the sky.

In this connection, other examples of ascending determination conditions will be described below.

Other Example 1 of Ascending Determination Condition

This example stipulates that the same unit-time cell count is maintained in a predetermined period.

Other Example 2 of Ascending Determination Condition

This example stipulates that a decrease in radio intensity in a cell of a connected base station is detected irrespective of an increase in radio intensity in a cell (or a neighboring cell) neighboring a cell of a wireless base station (or the connected base station) connected to the wireless communication device 100.

Other Example 3 of Ascending Determination Condition

This example stipulates that an increment or an absolute value of the unit-time cell count precluding neighboring cells is equal to or above a predetermined threshold.

Other Example 4 of Ascending Determination Condition

It is possible to set the threshold used for the ascending determination condition according to the flying region of the flying vehicle 1. The threshold used for the ascending determination condition may vary depending on the flying region of the flying vehicle 1.

Example 2 of Method to Change Communication Party Selecting Method

The communication controller 123 changes the communication party selecting method to a predetermined ground communication party selecting method when a decrement of the unit-time cell count is equal to or above a predetermined descending determination threshold (or a decrement of the unit-time cell count satisfies a descending determination condition). As an example of a method to determine the descending determination threshold, it is possible to determine a larger value than a decrement of the unit-time cell count in the flying place of the flying vehicle 1 on the ground. When a decrement of the unit-time cell count satisfies the descending determination condition, it is possible to determine that the flying vehicle 1 will descend down to the ground from the sky. Accordingly, the communication controller 123 changes the communication party selecting method to the ground communication party selecting method suitable to the flying vehicle 1 (or the wireless communication device 100) existing on the ground.

In this connection, other examples of descending determination conditions will be described below.

Other Example 1 of Descending Determination Condition

This example stipulates that the same unit-time cell count is maintained in a predetermined period.

Other Example 2 of Descending Determination Condition

This example stipulates that an increase in radio intensity in a cell of a connected base station is detected irrespective of a decrease in radio intensity in a neighboring cell.

Other Example 3 of Descending Determination Condition

This example stipulates that a decrement or an absolute value of the unit-time cell count precluding neighboring cells is equal to or above a predetermined threshold.

Other Example 4 of Descending Determination Condition

It is possible to set the threshold used for the descending determination condition according to the flying region of the flying vehicle 1. The threshold used for the descending determination condition may vary depending on the flying region of the flying vehicle 1.

(Step S22) The wireless communication device 100 determines whether to exit the communication control process. For example, the wireless communication device 100 exits the communication control process of FIG. 8 when the flight control unit 10 inputs a flight end signal, indicating an end of flight of the flying vehicle 1, to the wireless communication device 100. Alternatively, it is possible for the wireless communication device 100 to exit the communication control process of FIG. 8 when an external device outside the flying vehicle 1 instructs the wireless communication device 100 to exit the communication control process of FIG. 8 by communication. Upon determining exit of the communication control process, it is possible to exit the communication control process of FIG. 8. Unless the exit of the communication control process, the flow returns to step S11 to start the next measurement period.

Example 2 of Communication Control Method

Next, Example 2 of the communication control method according to the present embodiment will be described with reference to FIG. 9. FIG. 9 is a flowchart showing Example 2 of the communication control method according to the present embodiment. According to Example 2 of the communication control method, the communication controller 123 changes the communication party selecting method to select a wireless base station serving as a communication party from among a plurality of wireless base stations serving as communication party candidates due to the existence of an unlisted cell not listed on the neighboring cell list 143 among cells of wireless base stations identified by wireless signals received by the wireless communication part 103.

Figure 9:
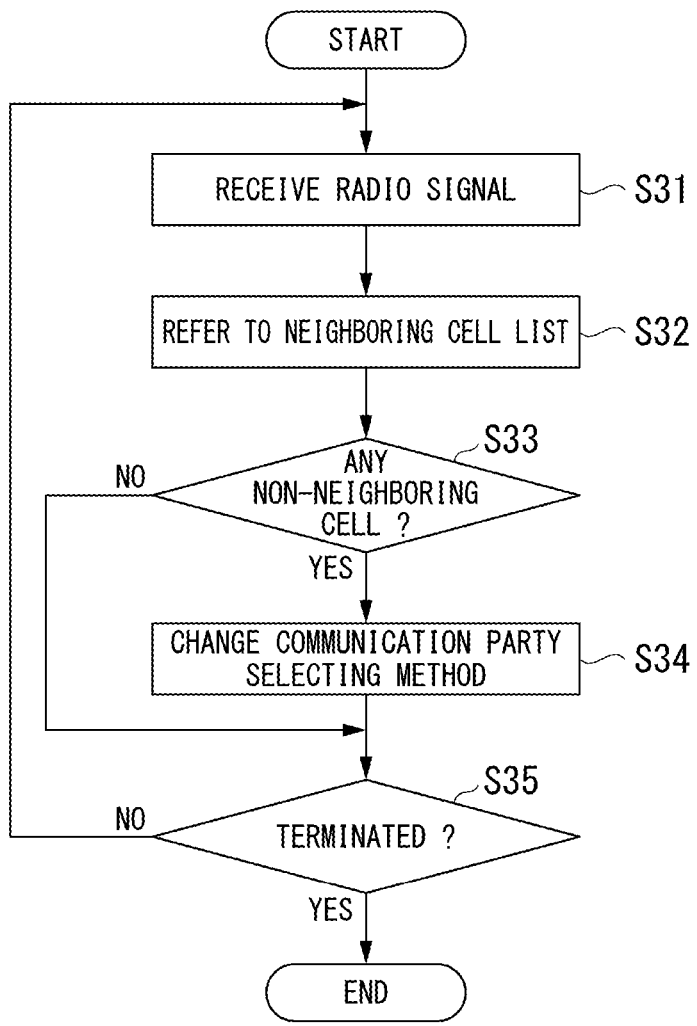
FIG. 9 is a flowchart showing Example 2 of a communication control method according to one embodiment.

The communication control process of FIG. 9 is started in synchronism with the start timing of the flying vehicle 1 to start flying. For example, the wireless communication device 100 may start the communication control process of FIG. 9 when the flight control unit 10 inputs a flight start signal, indicating the flying vehicle 1 to start flying, to the wireless communication device 100. Alternatively, it is possible for the wireless communication device 100 to start the communication control process of FIG. 9 when an external device outside the flying vehicle 1 instructs the wireless communication device 10 to start the communication control process of FIG. 9 by communication.

(Step S31) The wireless communication part 103 receives a wireless signal transmitted thereto from a wireless base station.

(Step S32) The communication controller 123 refers to the neighboring cell list 143. The neighboring cell list 143 referred here (or the reference neighboring cell list 143) is identical to the neighboring cell list 143 describing the same IDs of the connected cells as the cell IDs of the wireless base stations wirelessly connected to the wireless communication part 103.

(Step S33) The communication controller 123 determines whether or not an unlisted cell (or a non-neighboring cell) not listed on the reference neighboring cell list 143 is found among the cells of the wireless base stations identified by wireless signals received by the wireless communication part 103. The flow proceeds to step S34 when the determination result indicates the existence of a non-neighboring cell. Otherwise, the flow proceeds to step S35.

In this connection, it is possible to selectively check a non-neighboring cell having a lower radio intensity than a predetermined radio intensity among non-neighboring cells within the cells used for determining the existence/nonexistence of non-neighboring cells.

As a condition to determine the existence of non-neighboring cells (or a non-neighboring cell determination condition), it is possible to adopt various examples of non-neighboring cell determination conditions as follows.

Example 1 of Non-Neighboring Cell Determination Condition

This example stipulates that a non-neighboring cell continuously exists in a predetermined period.

Example 2 of Non-Neighboring Cell Determination Condition

This example stipulates that the number of non-neighboring cells is equal to or above a predetermined threshold.

Example 3 of Non-Neighboring Cell Determination Condition

This example determines the nonexistence of a non-neighboring cell only when the non-neighboring cell does not exist continuously in a predetermined period, otherwise, this example determines the existence of a non-neighboring cell.

It is possible to independently adopt Example 1 or Example 2 with respect to the non-neighboring cell determination condition, or it is possible to adopt combinations of Examples 1 and 2. In addition, a wireless base station connected to the wireless communication device 100 may provide the wireless communication device 100 with information indicating which non-neighboring cell determination condition is applied to the wireless communication device 100.

(Step S34) The communication controller 123 changes the communication party selecting method to a predetermined sky communication party selecting method. This is because due to good visibility in the sky rather than on the ground, it is assumed that the flying vehicle 1 flying in the sky may be highly likely to receive a wireless signal of a non-neighboring cell, which is not listed on the reference neighboring cell list 143, coming from a remote place.

(Step S35) The wireless communication device 100 determines whether to exit the communication control process. For example, the wireless communication device 100 exits the communication control process of FIG. 9 when the flight control unit 10 inputs a flight end signal, indicating an end of flight of the flying vehicle 1, to the wireless communication device 100. Alternatively, it is possible for the wireless communication device 100 to exit the communication control process of FIG. 9 when an external device outside the flying vehicle 1 instructs the wireless communication device 100 to exit the communication control process of FIG. 9 by communication. Upon determining the exit of the communication control process, it is possible to exit the communication control process of FIG. 9. Unless determining the exit of the communication control process, the flow returns to step S31 to continue the communication control process of FIG. 9.

The wireless communication device according to Example 2 of the communication control method can be defined as a wireless communication device installed in a flying vehicle, which includes a wireless communication part configured to receive a wireless signal transmitted from a wireless base station, a neighboring cell list storage configured to store a neighboring cell list received from the wireless base station wirelessly connected to the wireless communication part, and a communication controller configured to change a communication party selecting method to select the wireless base station serving as a communication party from among a plurality of wireless base stations serving as communication party candidates upon checking the existence of an unlisted cell not listed on the neighboring cell list among cells of wireless base stations identified by wireless signals received by the wireless communication part.

The communication control method according to Example 2 of the communication control method can be defined as a communication control method of a wireless communication device installed in a flying vehicle, which includes a wireless receiving step of the wireless communication device to receive a wireless signal transmitted from a wireless base station, a neighboring cell list storing step of the wireless communication device to store a neighboring cell list received from the wireless base station wirelessly connected thereto on a neighboring cell list storage, and a communication control step of the wireless communication device to change a communication party selecting method to select the wireless base station serving as a communication party from among a plurality of wireless base stations serving as communication party candidates upon checking the existence of an unlisted cell not listed on the neighboring cell list among cells of wireless base stations identified by wireless signals received in the wireless receiving step.

A computer program according to Example 2 of the communication control method can be defined as a computer program causing a computer of a wireless communication device installed in a flying vehicle, which includes a wireless communication part configured to receive a wireless signal transmitted from a wireless base station, to implement a neighboring cell list storing function of storing a neighboring cell list received from the wireless base station wirelessly connected to the wireless communication part, and a communication control function of changing a communication party selecting method to select the wireless base station serving as a communication party from among a plurality of wireless base stations serving as communication party candidates upon checking the existence of an unlisted cell not listed on the neighboring cell list among cells of wireless base stations identified by wireless signals received by the wireless communication part.

Example 3 of Communication Control Method

Next, Example 3 of the communication control method according to the present embodiment will be described with reference to FIG. 10. FIG. 10 is a flowchart showing Example 3 of the communication control method according to the present embodiment. According to Example 3 of the communication control method, the communication controller 123 changes the communication party selecting method to select a wireless base station serving as a communication party from among a plurality of wireless base stations serving as communication party candidates when a radio quality indicator corresponding to the measurement result of the wireless measurement part 121 satisfies a predetermined sky indicator condition.

Figure 10:
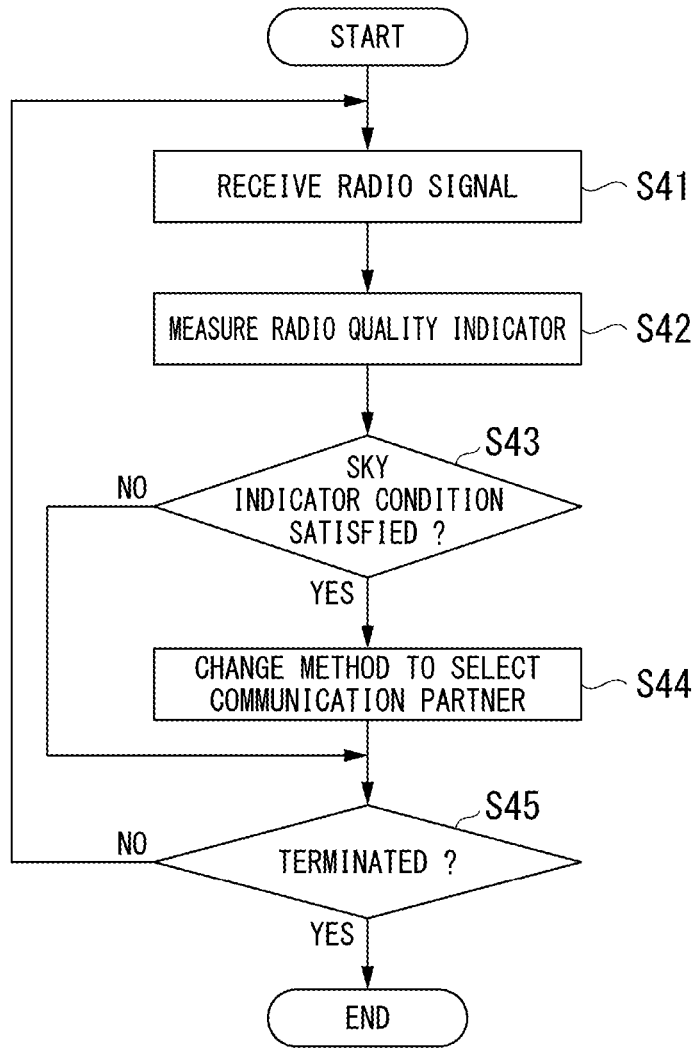
FIG. 10 is a flowchart showing Example 3 of a communication control method according to one embodiment.

The communication control process of FIG. 10 is started in synchronism with the start timing of the flying vehicle 1 to start flying. For example, the wireless communication device 100 starts the communication control process of FIG. 10 when the flight control unit 10 inputs a flying start signal, indicating the flying vehicle 1 to start flying, to the wireless communication device 100. Alternatively, it is possible to start the communication control process of FIG. 10 when an external device outside the flying vehicle 1 instructs the wireless communication device 100 to start the communication control process of FIG. 10 by communication.

(Step S41) The wireless communication part 103 receives a wireless signal transmitted thereto from a wireless base station.

(Step S42) Based on a wireless signal received by the wireless communication part 103, the wireless measurement part 121 measures a radio quality indicator of a cell of a wireless base station (or a connected base station) connected to the wireless communication device 100. For example, it is possible to measure a radio quality indicator, e.g. one of a RSSI, RSRP, and a SINR or a combination of multiple indicators among them.

(Step S43) The communication controller 123 determines whether or not the radio quality indicator, corresponding to the measurement result of the wireless measurement part 121, satisfies a predetermined sky indicator condition. The sky indicator condition is a condition to determine the existence of the flying vehicle 1 (or the wireless communication device 100) in the sky. Hereinafter, examples of sky indicator conditions will be described below.

Example 1 of Sky Indicator Condition

In the case of a radio quality indicator representative of a RSSI, the sky indicator condition indicates whether a measured RSSI value is equal to or above a sky determination RSSI threshold. As an example of a determination method to determine a sky determination RSSI threshold, it is possible to determine a larger value than the measured RSSI value at the flying place of the flying vehicle 1 on the ground. This is because it is assumed that a RSSI will be increased in the sky rather than on the ground due to good visibility in the sky rather than on the ground.

Example 2 of Sky Indicator Condition

In the case of a radio quality indicator representative of a RSRP, the sky indicator condition indicates whether a measured RSRP value is equal to or above a sky determination RSRP threshold. As an example of a determination method to determine a sky determination RSRP threshold, it is possible to determine a larger value than the measured RSRP value at the flying place of the flying vehicle 1 on the ground. This is because it is assumed that a RSRP will be increased in the sky rather than on the ground due to good visibility in the sky rather than on the ground.

Example 3 of Sky Indicator Condition

In the case of a radio quality indicator representative of a SINR, the sky indicator condition indicates whether a measured SINR value is less than a sky determination SINR threshold. As an example of a determination method to determine a sky determination SINR threshold, it is possible to determine a smaller value than the measured SINR value at the flying place of the flying vehicle 1 on the ground. This is because it is assumed that a SINR will be deteriorated in the sky rather than on the round since an interference wave will be increased further than a desired wave in the sky rather than on the ground although both a desired wave and an interference wave may be increased in reception power due to good visibility in the sky rather than on the ground.

To use a combination of multiple indicators among a RSSI, a RSRP, and a SINR as a radio quality indicator, it is possible to use a combination of sky indicator conditions corresponding to multiple indicators. In this case, it is possible to make a decision of "YES" in step S43 as to "sky indicator condition satisfied?" when all the radio quality indicators satisfy their sky indicator conditions, or it is possible to make a decision of "YES" in step S43 as to "sky indicator condition satisfied?" when at least one radio quality indicator satisfies its sky indicator condition. For example, it is possible to make a decision of "YES" in step S43 as to "sky indicator condition satisfied?" according to wireless environments at the flying place of the flying vehicle 1.

The communication controller 123 may determine that the flying vehicle 1 exists in the sky when a tendency of variations of a measured RSSI value or a measured RSRP value, or a tendency of variations of both the measured RSSI value and the measured RSRP value, is different from a tendency of variations of a measured SINR value. For example, the communication controller 123 may determine that the flying vehicle 1 exists in the sky due to an increasing tendency in variations of a measured RSSI value or a measured RSRP value, or variations of both the measured RSSI value and the RSRP value, irrespective of a decreasing tendency in variations of a measured SINR value.

In addition, it is possible for the communication controller 123 to use other sky indicator conditions based on the position or the moving direction of the flying vehicle 1. Other examples of sky indicator conditions will be described below.

Example 4 of Sky Indicator Condition

When the flying vehicle 1 is not moving in a horizontal direction, the communication controller 123 determines that the flying vehicle 1 exists in the sky due to an increase of a measured RSSI value or a measured RSRP value or an increase of both the measured RSSI value and the measured RSRP value.

Example 5 of Sky Indicator Condition

The communication controller 123 determines that the flying vehicle 1 exists in the sky when a measured RSSI value or a measured RSRP value is equal to or above a predetermined threshold or when both the measured RSSI value and the measure RSRP value are equal to or above the predetermined threshold.

The flow proceeds to step S44 when the determination result of step S43 indicates that a radio quality indicator satisfies a sky indicator condition. Otherwise, the flow proceeds to step S45.

(Step S44) The communication controller 123 changes the communication party selecting method to the predetermined sky communication party selecting method.

(Step S45) The wireless communication device 100 determines whether to exit the communication control process.

For example, the wireless communication device 100 exits the communication control process of FIG. 10 when the flight control unit 10 inputs a flight end signal, indicating an end of flight of the flying vehicle 1, to the wireless communication device 100. Alternatively, it is possible for the wireless communication device 100 to exit the communication control process of FIG. 10 when an external device outside the flying vehicle 1 instructs the wireless communication device 10 to exit the communication control process of FIG. 10 by communication. Upon determining the exit of the communication control process, it is possible to determine the communication control process of FIG. 10. Unless the exit of the communication control process, the flow returns to step S41 to continue the communication control process of FIG. 10.

A wireless communication device according to Example 3 of the communication control method can be defined as a wireless communication device installed in a flying vehicle, which includes a wireless communication part configured to receive a wireless signal transmitted from a wireless base station, a wireless measurement part configured to measure a radio quality indicator based on the wireless signal received by the wireless communication part, and a communication controller configured to change a communication party selecting method to select the wireless base station serving as a communication party from among a plurality of wireless base stations serving as communication party candidates when the radio quality indicator measured by the wireless measurement part satisfies a predetermined sky indicator condition.

A communication control method according to Example 3 of the wireless control method can be defined as a communication control method of a wireless communication device installed in a flying vehicle, which includes a wireless reception step to receive a wireless signal transmitted from a wireless base station, a wireless measurement step to measure a radio quality indicator based on the wireless signal received in the wireless reception step, and a communication control step to change a communication party selecting method to select the wireless base station serving as a communication party from among a plurality of wireless base stations serving as communication party candidates when the radio quality indicator satisfies a predetermined sky indicator condition.

A computer program according to Example 3 of the communication control method can be defined as a computer program causing a computer of a wireless communication device, which is installed in a flying vehicle and includes a wireless communication part configured to receive a wireless signal transmitted from a wireless base station, to implement a wireless measurement function of measuring a radio quality indicator based on the wireless signal received by the wireless communication part, and a communication control function of changing a communication party selecting method to select the wireless base station serving as a communication party from among a plurality of wireless base stations serving as communication party candidates when the radio quality indicator satisfies a predetermined sky indicator condition.

Next, examples of communication party selecting methods according to the present embodiment will be described below.

Example 1 of Communication Party Selecting Method

Example 1 of the communication party selecting method is realized by changing handover parameters used to control handover among a plurality of wireless base stations serving as communication party candidates. A situation allowing for an increasing number of wireless base stations serving as handover destination candidates having the same level of reception quality may occur in the sky rather than on the ground.

This may result in the occurrence of handover failures such as a failed handover and a frequently repeated handover, which may destabilize communication with the wireless communication device 100 existing in the sky. According to Example 1 of the communication party selecting method, it is possible to suppress the occurrence of handover failures by changing handover parameters, thus preventing destabilization of communication with the wireless communication device 100 existing in the sky. The following descriptions refer to examples of changing methods to change handover parameters.

Example 1 of Changing Method to Change Handover Parameters

This example increases a trigger time (TTT: Time TO Trigger) in the sky (i.e. the sky communication party selecting method) to be longer than a trigger time on the ground (i.e. the ground communication party selecting method). Herein, TTT is a protection time measured between the timing of the wireless communication device 100 to establish a transmission condition of making a measurement report, which may trigger handover, and the timing of the wireless communication device 100 to transmit the measurement report. As TTT becomes longer, it is possible to obtain an effect of suppressing handover from being frequently repeated. As an example of a determination method to determine a TTT value in the sky, it is possible to determine a larger value than a TTT value at the flying place of the flying vehicle 1 on the ground.

Example 2 of Changing Method to Change Handover Parameters

This example inhibits handover in the sky (i.e. the sky communication party selecting method). For example, a TTT value is set to infinite. This may prevent the occurrence of handover. In this connection, it is possible to limit a time to inhibit handover (i.e. a handover inhibit time) to a certain time. The handover inhibit time is set in advance.

The communication controller 123 may acquire candidates of handover parameters from wireless base stations accessible by the flying vehicle 1 in its flying place. A wireless base station covering the flying place may hold candidates of handover parameters suitable to the ground and candidates of handover parameters suitable to the sky. For example, it is possible to hold the handover parameter candidate data 141 shown in FIG. 5. The communication controller 123 may acquire handover parameter candidates (e.g. the handover parameter candidate data 141) from a wireless base station accessible by the flying vehicle 1 in its flying place so as to suppress the occurrence of handover failures using handover parameter candidates. Similar to handover parameter candidates, the communication controller 123 may acquire information representing the handover inhibit time from a wireless base station accessible by the flying vehicle 1 in its flying place.

In this connection, the handover inhibit time would be variable according to the moving speed of the flying vehicle 1. For example, it is possible to reduce the handover inhibit time to be shorter as the moving speed of the flying vehicle 1 becomes higher in a horizontal direction. This is because wireless communication environments may be changed in a short time as the moving speed of the flying vehicle 1 becomes higher in a horizontal direction, and therefore it is possible to adapt to variations of wireless communication environments by reducing the handover inhibit time.

Alternatively, it is possible for the wireless communication device 100 to provide a plurality of handover parameter candidates, thus changing the actually used handover parameter candidates according to the moving speed of the flying vehicle 1.

Example 2 of Communication Party Selecting Method

The Example 2 of the communication party selecting method changes the number of wireless base stations conducting concurrent communications (or a concurrently communicating base station count) among a plurality of wireless base stations serving as communication party candidates. A situation allowing for an increasing number of wireless base stations having the same level of reception quality may occur in the sky rather than on the ground. For this reason, it is possible to carry out multiple base station coordinated communications by increasing the number of wireless base stations configured to concurrently communicate with the wireless communication device 100 existing in the sky rather than on the ground, thus improve the communication speed of the wireless communication device 100 and its communication reliability. As an example of a determination method to determine the concurrently communicating base station count (or the sky communication party selecting method) of the wireless communication device 100 existing in the sky, it is possible to determine a larger value than the actually measured value of the concurrently communicating base station count (or the ground communication party selecting method) of the flying vehicle 1 in its flying place on the ground.

Next, variations of the present embodiment will be described below.

Variation 1 of Present Embodiment

The authentication request part 126 acquires the authentication information of the flying vehicle 1 from the authentication information storage 12 of the flight control unit 10 installed in the flying vehicle 1, and therefore the authentication request part 126 requests authentication of the flying vehicle 1 by transmitting the authentication information to a authentication server configured to authenticate the flying vehicle 1. For example, the timing to make an authentication request for the flying vehicle 1 is a timing to start flying the flying vehicle 1. For example, the authentication request part 126 of the wireless communication device 100 makes an authentication request for the flying vehicle 1 when the flight control unit 10 inputs a flight start signal, indicating the flying vehicle 1 to start flying, to the wireless communication device 100. Alternatively, it is possible for the authentication request part 126 of the wireless communication device 100 to make an authentication request for the flying vehicle 1 when an external device outside the flying vehicle 1 instructs the wireless communication device 100 to request authentication of the flying vehicle 1 by communication. The authentication request part 126 receives from the authentication server its response (e.g. an authentication passed or an authentication failed) to the authentication request for the flying vehicle 1. The communication controller 123 changes the communication party selecting method when the authentication request made by the authentication part 126 result in successfully authenticating the flying vehicle 1, but the communication controller 123 does not change the communication party selecting method when the authentication request results in a failure of authenticating the flying vehicle 1. According to Variation 1 of the present embodiment, it is possible for the wireless communication device 100 installed in the flying vehicle 1 to reliably change the communication party selecting method.

In this connection, the flying vehicle 1 may authenticate the wireless communication device 100 using the unique information of a SIM (Subscriber Identity Module) card installed in the wireless communication device 100 such that only the wireless communication device 100 successfully passing authentication can change the communication party selecting method. Alternatively, a wireless base station connected to the wireless communication device 100 may authenticate the wireless communication device 100 such that only the wireless communication device 100 successfully passing authentication can change the communication party selecting method. For example, it is possible to encrypt information (e.g. handover parameter candidates) necessary to change the communication party selecting method and to provide a decryption key to the wireless communication device 100 so that only the wireless communication device 100 successfully passing authentication can decrypt the encrypted information using the decryption key.

Variation 2 of Present Embodiment

The horizontal-direction position information acquisition part 124 acquires the horizontal-direction position information representing the position of the flying vehicle 1 in a horizontal direction. Based on the horizontal-direction position information acquired by the horizontal-direction position information acquisition part 124, the communication controller 123 determines whether or not the moving distance of the flying vehicle 1 falls within a certain range of distance. As an example of a determination method, it is possible to determine that the moving distance of the flying vehicle 1 falls within a certain range of distances when a range of positions including the position of the horizontal-direction position information (i.e. a longitude and a latitude) falls within a predetermined range of positions, otherwise, it is possible to determine that the moving distance of the flying vehicle 1 does not fall within a certain range of distances. Upon determining that the moving distance of the flying vehicle 1 falls within a certain range of distances, the communication controller 123 increases intervals of measuring the unit-time cell count by a predetermined time (e.g. a measurement standby time). As an example of a method to increase intervals of measuring the unit-time cell count by the predetermined time, it is possible to modify the flowchart of FIG. 8 according to Example 1 of the communication control method such that the unit-time timer T2 is started in step S12 after holding the measurement standby time after resetting the cell counter 122, and then the flow proceeds to step S13. According to Variation 2 of the present embodiment, it is possible to reduce a working load of the wireless communication device 100 and its power consumption by decreasing the frequency to measure the unit-time cell count if no variations occur in wireless communication environments since the flying vehicle 1 is moving in a certain range of distances.

Variation 3 of Present Embodiment

The flying-vehicle moving direction determination part 125 determines whether the moving direction of the flying vehicle 1 is either a vertical direction or a horizontal direction. As an example of a determination method, the flying-vehicle moving direction determination part 125 uses the flight positioning part 30 of the flying vehicle 1. The wireless communication device 100 acquires a positioning value of the flight positioning part 30 (e.g. "a horizontal-direction position (i.e. a longitude and a latitude) and "a vertical-direction position (i.e. an altitude)) by means of the flight control unit 10. Based on the positioning value of the flight positioning part 30, the flying-vehicle moving direction determination part 125 calculates a horizontal-direction movement and a vertical-direction movement in a predetermined time. The flying-vehicle moving direction determination part 125 determines that the moving direction of the flying vehicle 1 is a vertical direction when the calculation result indicates that the vertical-direction movement is larger than the horizontal-direction movement. On the other hand, the flying-vehicle moving direction determination part 125 determines that the moving direction of the flying vehicle 1 is a horizontal direction when the calculation result indicates that the horizontal-direction movement is larger than the vertical-direction movement.

In this connection, the flight control unit 10 may outputs a moving direction signal representing a moving direction (either a vertical direction or a horizontal direction) such that the flying-vehicle moving direction determination part 125 can determine the moving direction indicated by the moving direction signal (either a vertical direction or a horizontal direction) as the moving direction of the flying vehicle 1.

According to the sky communication party selecting method, the communication controller 123 changes the communication party selecting method from the sky communication party selecting method to a predetermined sky communication party selecting method for horizontal movement when the flying-vehicle determination part 125 determines that the moving direction of the flying vehicle 1 is a horizontal direction. The sky communication party selecting method for horizontal movement is a communication party selecting method suitable to the flying vehicle 1 (or the wireless communication device 100) flying in the sky in a horizontal direction. This is because it is preferable to use a communication party selecting method (e.g. the sky communication party selecting method for horizontal movement) suitable to the current status of the flying vehicle 1 since wireless base stations serving as transmission sources of wireless signals reaching the wireless communication device 100 may be sequentially changed from one wireless base station to another wireless base station while the flying vehicle 1 (or the wireless communication device 100) is moving in a horizontal direction in the sky. The following descriptions refer to examples of sky communication party selecting methods for horizontal movement.

Example 1 of Sky Communication Party Selecting Method for Horizontal Movement

According to Example 1 of the sky communication party selecting method for horizontal movement, the sky communication party selecting method would be equivalent to the ground communication party selecting method. As described above, wireless base stations serving as transmission sources of wireless signals reaching the wireless communication device 100 may be sequentially changed from one wireless base station to another wireless base station while the flying vehicle 1 (or the wireless communication device 100) is moving in the sky in a horizontal direction. This situation can be assumed to be similar to the situation of the flying vehicle 1 moving on the ground, and therefore it is possible to use the ground communication party selecting method as the sky communication party selecting method for horizontal movement.

Example 2 of Sky Communication Party Selecting Method for Horizontal Movement

According to Example 2 of the sky communication party selecting method for horizontal movement, the sky communication party selecting method for horizontal movement would be an intermediate method between the ground communication party selecting method and the sky communication party selecting method. For example, a sky TTT for horizontal movement is set to an intermediate value between a ground TTT and a sky TTT. Alternatively, a sky concurrently communicating base station count for horizontal movement can be set to an intermediate value between a ground concurrently communicating base station count and a sky concurrently communicating base station count.

Variation 4 of Present Embodiment

With reference to the parameter change region information 142, the communication controller 123 determines whether or not a cell (or a parameter-change-region cell) having the same cell ID as a parameter-change-region cell ID included in the parameter change region information 142 is included in the cells of the wireless base stations identified by the wireless signals received by the wireless communication part 103. The communication controller 123 changes its communication party selecting method when the determination result indicates the existence of the parameter-change-region cell, but the communication controller 123 does not change its communication party selecting method when the determination result indicates the nonexistence of the parameter-change-region cell. According to Example 4 of the present embodiment, it is possible to specify the region to change its communication party selecting method.

Variation 5 of Present Embodiment

The communication controller 123 acquires from the flight control unit 10 the remaining charge information representing the remaining charge of a battery serving as a power source of the flying vehicle 1. The power source 80 notifies the flight control unit 10 of the remaining charge information. The communication controller 123 relaxes the condition to change the communication party selecting method to the sky communication selecting method when the remaining charge indicated by the remaining charge information is less than a predetermined remaining charge threshold. Alternatively, the communication controller 123 decreases an ascending determination threshold, serving as the condition to change the communication party selecting method to the sky communication party selecting method, to a predetermined value when the remaining charge of the remaining charge information is less than the predetermined remaining charge threshold. Accordingly, the flying vehicle 1 (or the wireless communication device 100) may use the sky communication party selecting method while ascending up into the sky; hence, it is possible to prevent overconsuming a battery charge by suppressing handover failures and frequent occurrence of handover using the sky TTT.

Variation 6 of Present Embodiment

The communication controller 123 changes the communication party selecting method to select a wireless base station serving as a communication party from among a plurality of wireless base stations serving as communication party candidates when the unit-time cell count representing the counting result of the cell counter 122 is continuously increasing or decreasing in a predetermined time. The situation in which the unit-time cell count representing the counting result of the cell counter 122 is continuously increasing in a predetermined time can be assumed as the situation in which the flying vehicle 1 (or the wireless communication device 100) is ascending upon into the sky. Due to an improvement of visibility being gradually improved while the flying vehicle 1 (or the wireless communication device 100), the number of wireless base stations serving as transmission sources of wireless signals reaching the wireless communication device 100 will be steadily increased until the flying vehicle 1 reaches a certain altitude. As described above, the communication controller 123 changes its communication party selecting method to the sky communication party selecting method when the unit-time cell count representing the counting result of the cell counter 122 is continuously increasing in a predetermined time. In this connection, a range of distances measured between the wireless communication device 100 and wireless base stations would be increased so much when the flying vehicle 1 (or the wireless communication device 100) ascends up in the sky to be higher than a certain altitude, and therefore the number of wireless base stations serving as transmission sources of wireless signals reaching the wireless communication device 100 will be steadily decreased.

The situation in which the unit-time cell count representing the counting result of the cell counter 122 is continuously decreasing in a predetermined time would be assumed as the situation in which the flying vehicle 1 (or the wireless communication device 100) is descending in altitude. The descending movement of the flying vehicle 1 (or the wireless communication device 100) may gradually deteriorate visibility, thus steadily decreasing the number of wireless base stations serving as transmission sources of wireless signals reaching the wireless communication device 100. Accordingly, the communication controller 123 changes its communication party selecting method to the ground communication party selecting method when the unit-time cell count representing the counting result of the cell counter 122 is continuously decreased in a predetermined time.

The above descriptions have explained variations of the present embodiment.

According to the present embodiment in which the wireless communication device 100 existing in the sky uses the sky communication party selecting method, it is possible to improve stability of communication with the wireless communication device 100 existing in the sky. In addition, it is possible for the wireless communication device 100 existing on the ground to restore the ground communication party selecting method. For this reason, it is possible to provide the wireless communication device 100 with a stable communication in the sky by way of a cellular network system, which is designed to provide mobile communication services on the ground, applied to the wireless communication device 100 installed in the flying vehicle 1. Accordingly, it is possible to stabilize communication even when the flying vehicle 1 is remotely controlled using communication with the wireless communication device 100, and therefore it is possible to obtain an effect of improving reliability in remote control of the flying vehicle 1.

In addition, the present embodiment is able to determine an ascending movement or a descending movement of the flying vehicle 1 without using measured values of an altimeter. In other words, it is unnecessary to convert handover parameter candidates according to measured values of an altitude.

Heretofore, the prevent invention has been described in detail by way of embodiments with reference to the drawings, whereas concrete configurations are not necessarily limited to the foregoing embodiments; hence, the present invention may include any design changes without departing from the subject matter of the invention.

For example, a flying vehicle installing the wireless communication device 100 of the present embodiment may be an autopilot flying vehicle, a remotely-operated flying vehicle, or a manned flying vehicle operated by a human operator such as a pilot boarding a flying vehicle.

It is possible to store computer programs achieving the functions of the aforementioned devices on computer-readable storage media so that computer systems can load an execute computer programs stored on storage media. Herein, the term "computer system" may include an OS and hardware such as peripheral devices.

In addition, the term "computer-readable storage media" may refer to flexible disks, magneto-optical disks, ROM, rewritable non-volatile memory such as flash memory, portable media such as DVDs (Digital Versatile Discs), and storage devices such as hard disks embedded in computer systems.

Moreover, the term "computer-readable storage media" may include any measures for temporarily holding programs such as non-volatile memory (e.g. a DRAM (Dynamic Random-Access Memory)) inside computer systems serving as servers or clients to receive programs transmitted thereto through networks like the Internet and communication lines like telephone lines.

The aforementioned programs may be transferred from computer systems having storage devices configured to store programs to other computer systems through transmission media or by way of transmission waves propagating through transmission media. Herein, the term "transmission media" for transmitting programs may refer to any media having functions to transmit information such as network (or communication networks) like the Internet and communication lines like telephone lines.

The foregoing programs may achieve part of the foregoing functions.

In addition, the foregoing programs may be differential files (or differential programs) which can be combined with pre-installed programs of computer systems to achieve the foregoing functions.

REFERENCE SIGNS LIST 1 flying vehicle
10 flight control unit
12 authentication information storage
30 flight positioning part
40 camera
60 monitor
80 power source
100 wireless communication device
101 CPU
102 storage
103 wireless communication part
104 positioning part
121 wireless measurement part
122 cell counter
123 communication controller 124 horizontal-direction position information acquisition part
125 flying-vehicle moving direction determination part
126 authentication request part
140 data storage

The invention claimed is:

1. A wireless communication device comprising:
    a wireless communication part configured to receive a wireless signal transmitted from a wireless base station; and
    a processor configured to
        calculate a first number indicating a number of first cells, the first cells being selected among cells from which the wireless communication part receives wireless signals, such that each of the first cells is identified by a wireless signal satisfying a condition of a reception strength received by the wireless communication part, and
        determine whether or not the first number satisfies a predetermined condition,
    wherein the predetermined condition indicates whether or not the calculated first number is equal to or above a threshold number of cells.

2. The wireless communication device according to claim 1, wherein the wireless communication device is mountable on a flying vehicle.

3. The wireless communication device according to claim 1, wherein the processor is configured to identify a cell according to identification information indicated by a wireless signal received by the wireless communication part.

4. The wireless communication device according to claim 1, wherein the processor is configured to identify a cell according to a frequency of a wireless signal received by the wireless communication part.

5. The wireless communication device according to claim 1, wherein the reception strength of the wireless signal is RSSI (Receives Signal Strength Indicator).

6. The wireless communication device according to claim 1, wherein the reception strength of the wireless signal is RSRP (Reference Signal Received Power).

7. The wireless communication device according to claim 1, wherein the processor is configured to determine whether the first number satisfies the predetermined condition after an authentication is performed based on authentication information transmitted from the wireless communication device.

8. The wireless communication device according to claim 7, wherein the wireless base station connected to the wireless communication device is configured to perform the authentication.

9. The wireless communication device according to claim 7, wherein the authentication information is unique information of an SIM (Subscriber Identity Module) card mounted on a flying vehicle.

10. The wireless communication device according to claim 7, wherein the processor is configured to calculate the first number upon a successful authentication.

11. The wireless communication device according to claim 1, wherein the wireless communication part is configured to transmit a measurement report including a result of calculating the first number.

12. The wireless communication device according to claim 11, wherein the wireless communication part is configured to transmit the measurement report upon determining that the calculated first number is equal to or above the threshold number of cells.

13. The wireless communication device according to claim 11, wherein the measurement report includes a radio quality indicator measured based on a wireless signal received by the wireless communication part.

14. The wireless communication device according to claim 13, wherein the radio quality indictor is RSSI (Receives Signal Strength Indicator) of the wireless signal.

15. The wireless communication device according to claim 13, wherein the radio quality indicator is RSRP (Reference Signal Received Power) of the wireless signal.

16. The wireless communication device according to claim 11, wherein the measurement report includes identification information of a cell indicated by a wireless signal received by the wireless communication part.

17. The wireless communication device according to claim 1, wherein the processor is provided with the predetermined condition from the wireless base station connected to the wireless communication device before determining whether or not the first number satisfies the predetermined condition.

18. A communication control method adapted to a wireless communication device having a wireless communication part configured to receive a wireless signal transmitted from a wireless base station, comprising:
    calculating a first number indicating a number of first cells, the first cells being selected among cells from which the wireless communication part receives wireless signals, such that each of the first cells is identified by a wireless signal satisfying a condition of a reception strength received by the wireless communication part; and
    determining whether or not the first number satisfies a predetermined condition,
    wherein the predetermined condition indicates whether or not the calculated first number is equal to or above a threshold number of cells.

19. The communication control method according to claim 18, wherein the wireless communication device is mountable on a flying vehicle.

20. The communication control method according to claim 18, wherein the wireless communication device is configured to determine whether or not the first number satisfies the predetermined condition after an authentication based on authentication information transmitted from the wireless communication device.

21. The communication control method according to claim 20, further comprising:
    performing the authentication by the wireless base station connected to the wireless communication device.

22. The communication control method according to claim 20, wherein the authentication information is unique information of a SIM (Subscriber Identity Module) card.

23. The communication control method according to claim 20, further comprising:
    calculating the first number upon a successful authentication.

24. The communication control method according to claim 18, further comprising:
    transmitting, by the wireless communication part, a measurement report including a result of calculating the first number.

25. The communication control method according to claim 24, wherein transmitting the measurement report includes:
    transmitting the measurement report upon determining that the first number satisfies the predetermined condition.

26. The communication control method according to claim 24, wherein the measurement report includes a radio quality indicator measured based on a wireless signal received by the wireless communication part.

27. The communication control method according to claim 24, wherein the measurement report includes identification information of a cell indicated by a wireless signal received by the wireless communication part.

28. The communication control method according to claim 18, further comprising:
provicing the wireless communication device with the predetermined condition from the wireless base station connected to the wireless communication device before determining whether or not the first number satisfies the predetermined condition.

29. A flying vehicle comprising:
a flight control unit; and
a wireless communication device having a wireless communication part configured to receive a wireless signal transmitted from a wireless base station,
wherein the wireless communication device is configured to
calculate a first number indicating a number of first cells, the first cells being selected among cells from which the wireless communication part receives wireless signals, such that each of the first cells is identified by a wireless signal satisfying a condition of a reception strength received by the wireless communication part, and
determine whether or not the first number satisfies a predetermined condition, and
wherein the flight control unit is configured to receive a flight control for controlling the flying vehicle from an external device located externally of the flying vehicle or to transmit flight-condition data to the external device located externally of the flying vehicle,
wherein the predetermined condition indicates whether or not the calculated first number is equal to or above a threshold number of cells.

30. The flying vehicle according to claim 29, wherein the wireless communication device is configured to calculate the first number upon identifying a cell using identification information indicated by a wireless signal received by the wireless communication part.

31. The flying vehicle according to claim 29, further comprising an authentication-information storage unit configured to store authentication information,
wherein the wireless communication device is configured to determine whether or not the first number satisfies the predetermined condition after an authentication is performed based on the authentication information transmitted from the wireless communication device.

32. The flying vehicle according to claim 31, wherein the wireless base station connected to the wireless communication device is configured to perform the authentication.

33. The flying vehicle according to claim 31, wherein the authentication information is unique information of a SIM (Subscriber Identity Module) card.

34. The flying vehicle according to claim 29, wherein the wireless communication device is configured to calculate the first number upon a successful authentication.

35. The flying vehicle according to claim 29, wherein the wireless communication device is configured to transmit a measurement report including a result of calculating the first number.

36. The flying vehicle according to claim 35, wherein the wireless communication device is configured to transmit the measurement report upon determining that the first number is equal to or above the threshold number of cells.

37. The flying vehicle according to claim 35, wherein the measurement report includes a radio quality indicator measured based on a wireless signal received by the wireless communication part.

38. The flying vehicle according to claim 35, wherein the measurement report includes identification information of a cell indicated by a wireless signal received by the wireless communication part.

39. The flying vehicle according to claim 29, wherein the wireless communication device is provided with the predetermined condition from the wireless base station connected to the wireless communication device before determining whether or not the first number satisfies the predetermined condition.

* * * * *